United States Patent
Jubert

[11] Patent Number: 5,937,359
[45] Date of Patent: *Aug. 10, 1999

[54] APPARATUS WHICH INCLUDES A REMOVABLE CASING THAT CONTAINS AN ADAPTER FOR READING CHIP CARDS OF DIFFERENT FORMATS

[75] Inventor: Laurent Jubert, Change, France

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/778,227

[22] Filed: Jan. 8, 1997

[30] Foreign Application Priority Data

Jan. 10, 1996 [FR] France .................................. 96 00218

[51] Int. Cl.⁶ ....................................................... H04B 1/00
[52] U.S. Cl. ............................................ 455/550; 455/558
[58] Field of Search ............................. 455/90, 348, 558, 455/575, 550, 351, 349, 347, 557, 66, 344; 379/357, 428, 429, 433; 439/260; 257/679; 235/486

[56] References Cited

U.S. PATENT DOCUMENTS

| | | | |
|---|---|---|---|
| 4,975,086 | 12/1990 | Reichardt et al. | 439/629 |
| 5,224,873 | 7/1993 | Duffet et al. | 235/454 |
| 5,254,988 | 10/1993 | Nakano | 439/326 |
| 5,257,414 | 10/1993 | Trahan et al. | 455/90 |
| 5,336,877 | 8/1994 | Raab et al. | 235/475 |
| 5,353,327 | 10/1994 | Jokimies | 455/558 |
| 5,418,837 | 5/1995 | Johansson et al. | 455/558 |
| 5,436,969 | 7/1995 | Kobayashi | 379/428 |
| 5,604,787 | 2/1997 | Kotzin et al. | 455/558 |
| 5,615,250 | 3/1997 | Kobayashi | 455/90 |
| 5,615,260 | 3/1997 | Kurgan | 379/433 |
| 5,657,373 | 8/1997 | Hermanson et al. | 455/558 |
| 5,669,069 | 9/1997 | Rautila | 455/90 |
| 5,699,406 | 12/1997 | Liikanen et al. | 455/90 |

FOREIGN PATENT DOCUMENTS

| | | | |
|---|---|---|---|
| 0 453 737 | 3/1991 | European Pat. Off. | G01R 1/073 |
| 0 494 503 | 11/1991 | European Pat. Off. | G06K 7/06 |
| 0 522 762 | 6/1992 | European Pat. Off. | H04M 1/72 |
| 0 556 970 | 2/1993 | European Pat. Off. | H04B 1/38 |
| 0 702 460 | 3/1996 | European Pat. Off. | H04B 1/38 |
| 40 29 576 | 9/1990 | Germany | H01R 33/74 |
| 8-87582 | 4/1996 | Japan | G06K 19/077 |

*Primary Examiner*—Reinhard J. Eisenzopf
*Assistant Examiner*—Makoto Aoki
*Attorney, Agent, or Firm*—Dicran Halajian

[57] ABSTRACT

The invention provides an apparatus, for example, a portable telephone, which includes a chip card reader that has a connector which can be brought into contact with the contact pads of an integrated circuit present on a chip card of a first format called full-SIM format, which apparatus further includes a removable casing intended for being fixed in the operating position facing the chip card reader, and finally includes an adapter that makes it possible to insert and read a chip card of a second format called micro-SIM format, charactrized in that the removable casing contains the adapter which has a recess for receiving a chip card of the micro-SIM format, in that the removable casing contains a positioning device for holding the chip card of the micro-SIM format in position in the recess, and in that the recess and the positioning device have a configuration so that the contact pads of the integrated circuit which is present on the micro-SIM card are placed opposite the connector of the chip card reader after said card has been inserted.

2 Claims, 2 Drawing Sheets

APPARATUS WHICH INCLUDES A REMOVABLE CASING THAT CONTAINS AN ADAPTER FOR READING CHIP CARDS OF DIFFERENT FORMATS

FIELD OF THE INVENTION

The present invention relates to an apparatus, for example, a portable telephone, which includes a chip card reader that has a connector which can be brought into contact with the contact pads of an integrated circuit present on a chip card of a first format called full-SIM format, which apparatus further includes a removable casing intended for being fixed in an operating position facing the chip card reader, and finally includes an adapter that makes it possible to insert and read a chip card of a second format called micro-SIM format.

BACKGROUND OF THE INVENTION

Such an apparatus is known from European Patent no. 0 556 970 A1. This apparatus comprises an adapter which is placed in a recess so as not to form an obstacle for the insertion of the card when the adapter is arranged in the read mode for a chip card of the full-SIM format, that is to say the standard format for a chip card, and, when arranged in the read mode for a chip card of the micro-SIM format, that is to say, a card whose surface is reduced to the surface necessary for providing an integrated circuit thereon, tilts by a pivot link and places the contact pads of said integrated circuit against the connector of the chip card reader. The pivotal mounting used presents one drawback: while the adapter is tilted, it protrudes from the body of the apparatus and then becomes vulnerable to shock. A transverse shock may indeed break certain parts that form the pivotal mounting, thus irreparably separating the adapter from the apparatus.

It is an object of the present invention to remedy this drawback by proposing an adapter which is integrated, without a protrusion, with the body of the apparatus.

SUMMARY OF THE INVENTION

Indeed, according to the present invention, an apparatus of the type defined in the opening paragraph is characterized in that the removable casing contains the adapter which is formed by a recess intended for receiving a chip card of the micro-SIM format, and in that the removable casing comprises a positioning device for keeping the micro-SIM format card in the recess, and in that the recess and the positioning device have such a configuration that the contact pads of the integrated circuit present on the micro-SIM card are placed facing the connector of the chip card reader after said card has been inserted.

A particular embodiment of the invention provides an apparatus as described above, characterized in that the positioning device is formed by a strip made of a material which has a certain elasticity, whose ends are integral with the removable casing and whose form is curved in the direction of the recess intended for receiving a chip card of the micro-SIM format.

BRIEF DESCRIPTION OF THE DRAWINGS

These and other aspects of the invention are apparent from and will be elucidated with reference to the embodiments described hereinafter.

In the drawings.

DESCRIPTION OF PREFERRED EMBODIMENTS

Figure 1:
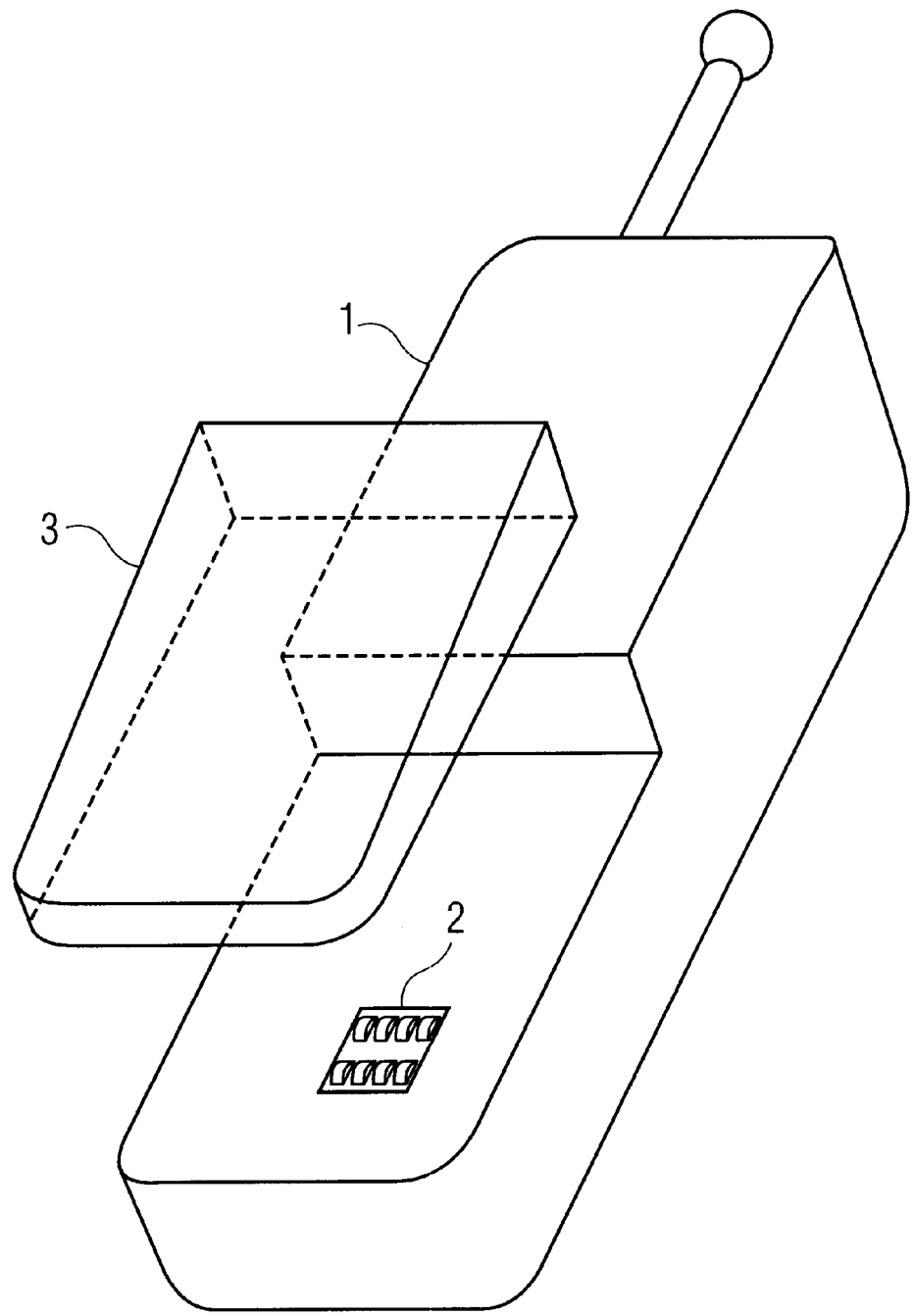
FIG. 1 is a diagrammatic representation of an apparatus which implements the invention.

FIG. 1 diagrammatically shows an apparatus 1, for example, a portable telephone, which includes a chip card reader that has a connector 2 which can be brought into contact with the contact pads of an integrated circuit present on a chip cud of a first format called full-SIM format. The apparatus 1 further includes a removable casing 3 which contains, for example, a battery used for the power supply of said apparatus 1. In operation, this removable casing 3 is fixed opposite the chip card reader.

Figure 2:
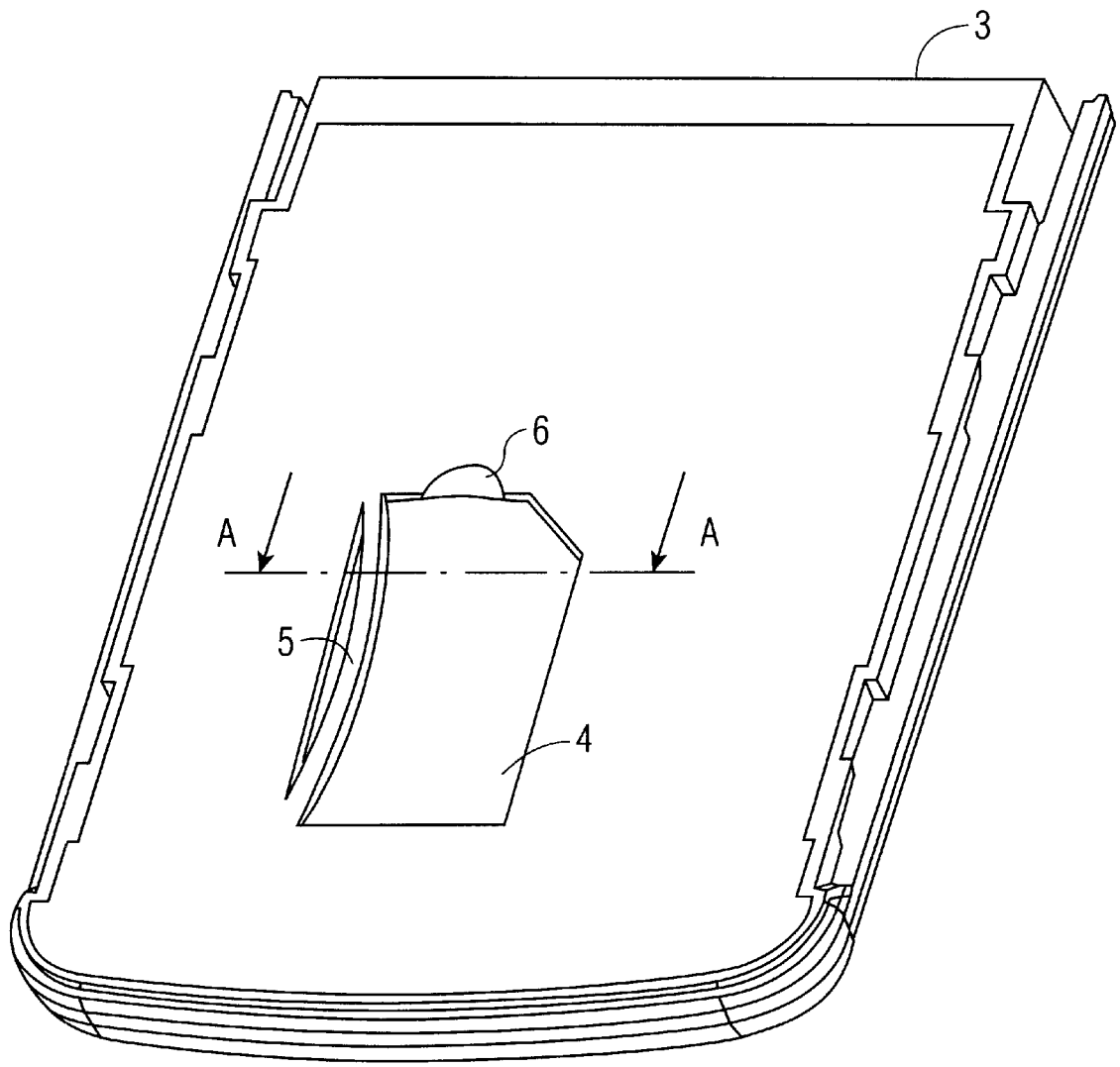
FIG. 2 is a diagrammatic representation of a removable casing according to a particular embodiment of the invention.

FIG. 2 diagrammatically shows said removable casing 3 which contains the adapter that consists of a recess 4 for receiving a chip card of a second format called micro-SIM format. The removable casing 3 further comprises a positioning device 5 for the chip card of the micro-SIM format in recess 4. Recess 4 and the positioning device 5 are shaped such that the contact pads of the integrated circuit which is present on the micro-SIM card are placed opposite the connector 2 of the chip card reader after said card has been inserted. In this particular embodiment of the invention, the positioning device 5 is formed by a strip made of a material that has a certain elasticity such as, for example, a mixture of ABS and polycarbonate, the ends of which strip are integral with the removable casing 3 and which strip has a concave form in the direction of the recess 4 which is intended for receiving a chip card of the micro-SIM format. A thumb notch 6 is made along a rim of the recess 4 to facilitate the removal of such a chip card.

Figure 3:
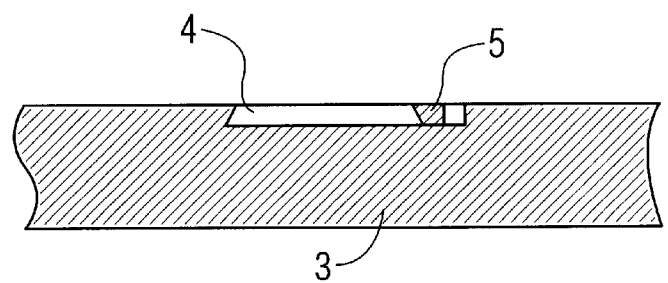
FIG. 3 is a partial cross-sectional view diagrammatically representing a part of a removable casing according to a particular embodiment of the invention.

FIG. 3 is a partial cross-section along an axis A.A in which the cross-section of the recess 4 is shown as well as that of the strip which forms the positioning device 5. They have a beveled form towards the inside of the recess 4 to facilitate the insertion and for keeping the chip card of the micro-SIM format in position.

I claim:

1. An apparatus comprising:

a chip card reader having a connector;

a removable casing which brings terminals of a full-SIM chip card in contact with said connector;

an adapter attached to said removable casing and having a recess which receives a micro-SIM chip card; and a positioning device located along an entire side wall of said recess to keep said micro-SIM chip card in said recess for contacting said connector, wherein said positioning device is elastic, uniformly curved toward said recess, and beveled toward inside of said recess to facilitate insertion of said micro-SIM chip card in said recess.

2. A wireless telephone comprising:

a chip card reader having a connector;

a removable casing which brings terminals of a full-SIM chip card in contact with said connector;

an adapter attached to said removable casing and having a recess which receives a micro-SIM chip card; and a positioning device located along an entire side wall of said recess to keep said micro-SIM chip card in said recess for contacting said connector, wherein said positioning device is elastic, uniformly curved toward said recess, and beveled toward inside of said recess to facilitate insertion of said micro-SIM chip card in said recess.

* * * * *